F. WALTS & D. MILLS.

Improvement in Power Rock Drill.

No. 122,342.                                   Patented Jan. 2, 1872.

Witnesses                               Inventors
Ayus Thompson                           Frank Walts
Jno. M. Signurn                         Dexter Mills

UNITED STATES PATENT OFFICE.

FRANK WALTS AND DEXTER MILLS, OF WATERTOWN, NEW YORK.

IMPROVEMENT IN POWER ROCK-DRILL.

Specification forming part of Letters Patent No. 122,342, dated January 2, 1872.

Be it known that we, FRANK WALTS and DEXTER MILLS, of Watertown, in the county of Jefferson and State of New York, have invented an Improvement in the Construction of Power-Drills; and we do hereby declare that the following is a full and exact description thereof, reference being had to the accompanying drawing and to the letters of reference marked thereon.

The nature of our invention consists in the construction and arrangement of the parts of a drilling-machine which operate the drill.

To enable others skilled in the art to make and use our invention, we will describe its construction and operation.

Figure 1:
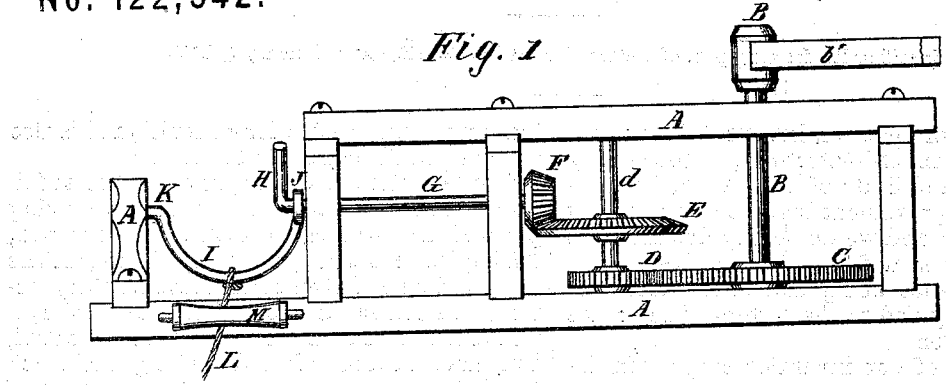
Figure 2:
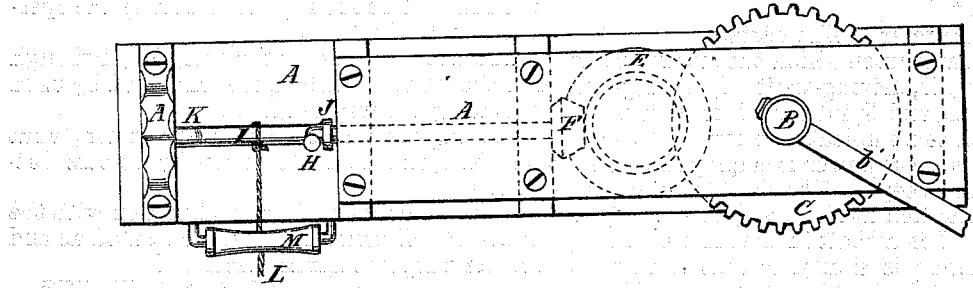
Figure 3:
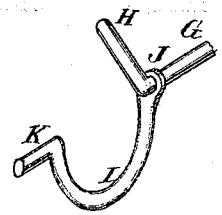

In the drawing, Figure 1 is an elevation; Fig. 2, a plan; and Fig. 3, a perspective view of our improvement.

Like letters refer to like parts.

A is the frame upon which the several parts are mounted; B, driving-shaft; C, driving-pulley; and D, E, and F, intermediate wheels and pinion which communicate motion to the shaft G. In case animal power is employed it is attached to the sweep $b$. The shaft G has on one end a continuation at right angles with it; or a crank, H. I is a shaft in the form of a bail, and its function is similar to that of a crank. On one end of this shaft I is the bearing K, and on the other end a loop or ring, J, in which ring turns the shaft G; and the ring J also turns on the shaft G. The rope L is attached to bail I, (passing under the friction-roller M,) and is also attached at the other end to the drill.

The operation of our improvement is as follows: When motion is given to the driving parts of the machine, the shaft G revolves, and, during its revolution, the crank H strikes the bail I. The bail then commences a rotary motion, and continues such motion until a revolution is completed. This motion raises the drill, by means of the rope L, and the height to which the drill is raised is governed by the length of the stroke made by the bail I, which stroke may be varied by bails of different sizes. When the bail has made a little more than half a revolution from its position in Fig. 1 the weight of the drill will bring the bail back to its position in Fig. 1 in advance of the crank H, and so on in continuous repetition during the operation of the drill.

The usual adjuncts of masts, &c., although not shown or described, are employed by us in operating our improvement.

Having thus described our invention, what we claim, and desire to secure by Letters Patent, is—

The bail or crank I, in combination with the crank H, all constructed and operated as and for the purposes herein described.

FRANK WALTS.
DEXTER MILLS.

Witnesses:
MYERS THOMPSON,
JNO. M. SIGOURNEY.

(124)